Aug. 21, 1962  J. KUIKEN  3,050,310
SEALS FOR ROTARY SHAFTS OF SHIPS
Filed May 23, 1960  2 Sheets-Sheet 1
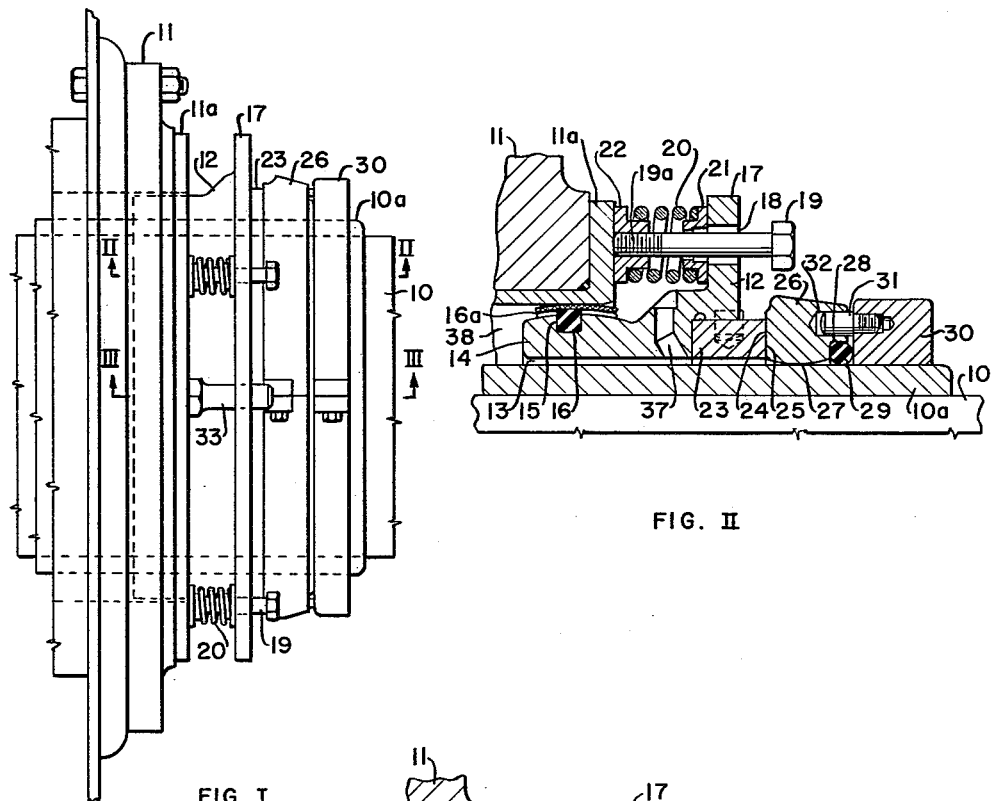
FIG. I
FIG. II
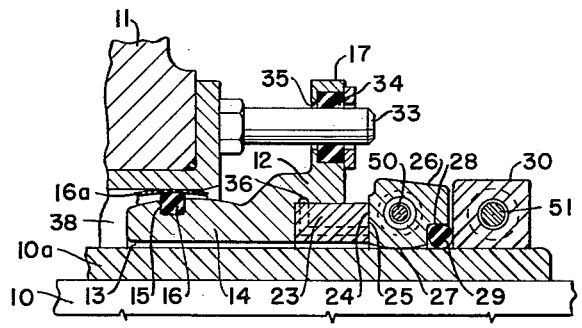
FIG. III
INVENTOR:
JAN KUIKEN
BY: A.D. Birch
HIS ATTORNEY

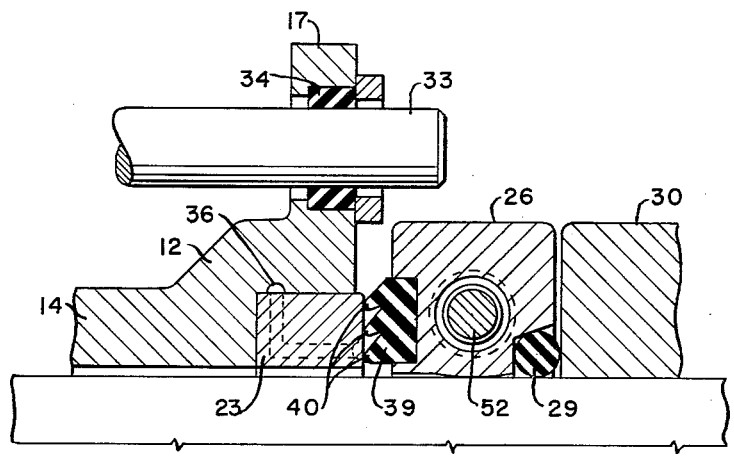
FIG. IV
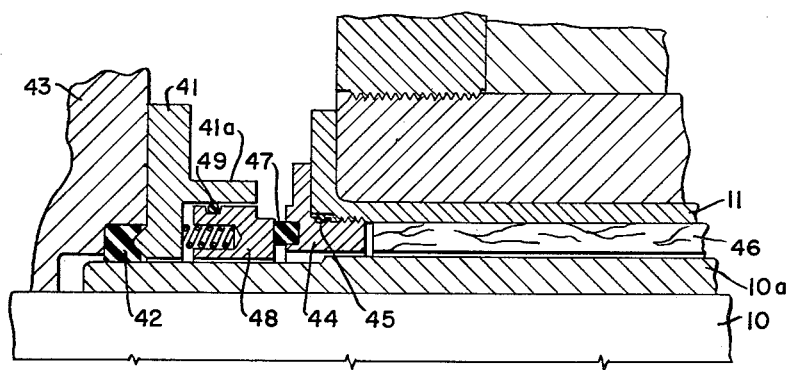
FIG. V
INVENTOR:
JAN KUIKEN
BY: *H. D. Burch*
HIS ATTORNEY United States Patent Office 3,050,310
Patented Aug. 21, 1962

3,050,310
SEALS FOR ROTARY SHAFTS OF SHIPS
Jan Kuiken, Old Coulsdon, England, assignor to Shell Oil Company, New York, N.Y., a corporation of Delaware
Filed May 23, 1960, Ser. No. 31,011
Claims priority, application Great Britain Oct. 8, 1959
9 Claims. (Cl. 277—30)

The present invention relates to seals for rotary shafts and is concerned in particular with seals for marine use for providing a liquid-tight seal between a ship's propeller shaft and the inboard end of the stern tube through which the shaft passes.

The so-called stuffing box type of seal has been known for rotary shafts for many years, and by way of an improvement on this simple type of seal, a rotatable seal has been proposed based on the provision of a non-rotatable member for attachment to the structure through which the rotatable shaft passes and a rotatable member for attachment to the shaft for rotation therewith and means for spring-loading the rotatable member towards the non-rotatable member so as to maintain a rubbing contact between the two members during rotation of the shaft. In this way the shaft may be liquid-tightly sealed with respect to the structure through which it passes. While such a rotatable seal may be quite suitable for sealing relatively small diameter shafts, it has been found that different considerations arise when it is desired to provide a liquid-tight seal between the propeller shaft of a sea-going ship (which may well have a diameter of up to 28 inches) and the stern tube of the ship, and in consequence of the sealing of the inboard end of the propeller shafts of sea-going ships to prevent ingress of water into the ship has hitherto been achieved by means of the well-known stuffing box type of seal (also referred to as a soft packing seal). However, in such applications the stuffing box seal is not without serious practical disadvantages. For example, it is difficult to maintain liquid-tightness and there is a tendency to cause wear on the shaft or shaft liner, the replacement of which is an expensive operation. There is also the disadvantage that even replacement of the packing is laborious, while if the shaft or shaft liner has worn to the extent that reconditioning or replacement is necessary an overhaul in dry dock is necessary.

A particular problem arises in the case of sea-going ships having propeller shafts greater than about 8 inches in diameter due to the inevitable relative movement which occurs between the shaft and the stern tube. With the rotatable seals hitherto proposed for use in conjunction with relatively small diameter shafts there is virtually no tolerance for relative movement between the shaft and the structure through which it passes without impairing the liquid-tightness of the seal even though the magnitude of the relative movement may be relatively small. For this reason it has been found that the forms of rotatable seal hitherto proposed, e.g. for pump driving shafts, do not provide a suitable solution to the problem of sealing the propeller shafts of sea-going ships having shafts of a diameter greater than about 8 inches, and an object of the present invention is to provide a form of rotatable seal which is suitable for use in sea-going ships having relatively large diameter propeller shafts.

According to the present invention there is provided in combination with and mounted on a ship's propeller shaft rotatable in a stern tube, a seal comprising an intermediate member and sealing element interposed between a non-rotatable member at the inboard end of the stern tube and a rotatable member attached to and rotating with the shaft, said intermediate member having a bore permitting restricted rocking movement about an axis at right angles to the shaft and said sealing element being interposed between said intermediate member and said rotatable member, the arrangement being such that the non-rotatable member and the intermediate member are biased toward each other so that during rotation of the shaft said non-rotatable member maintains rubbing contact with the adjacent face of said intermediate member.

While the bore of the intermediate member can be cylindrical and of such a diameter as to surround the shaft with sufficient clearance to permit the required rocking movement of the intermediate member to take place, it is preferable to provide the intermediate member with a slightly convex bore of such internal profile as to permit such rocking movement to take place without the intermediate member being a loose or sloppy fit on the shaft. If an intermediate member with a cylindrical bore is used it is possible to minimize the risk of wear on the outer ends of the bore—and also the risk of scoring the shaft (or shaft liner) therewith—by chamfering these outer ends; but it is preferable to employ an intermediate member with a slightly convex bore so as to provide the required rocking movement (to allow for movement of the shaft relative to the stern tube) while at the same time having a minimum clearance between the shaft and the intermediate member thus reducing to a minimum the possibility of unbalanced rotation of the intermediate member as the result of eccentricity.

Preferably the non-rotatable member is adapted for mounting on the inboard end of a stern tube or a part thereof as, for example, the stern tube bushing (which may be considered as being equivalent to the conventional stuffig box sleeve) in such a manner that while said member is non-rotatable with respect thereto said member is capable of limited movement with respect to the stern tube axially of the shaft to maintain the required sealing contact between the non-rotatable member and the intermediate member. In such an arrangement a resilient seal is provided between the non-rotatable member and the stern tube or part thereof so as to maintain liquid-tightness between these parts while permitting said limited relative movement. An alternative arrangement is, however, possible in which the non-rotatable member is adapted to be fixed to the stern tube and the rotatable member is adapted for attachment to the shaft in such a manner so as to rotate therewith, spring means being provided, e.g. between said rotatable member and said intermediate member for urging the intermediate member towards the non-rotatable member to maintain the required rubbing contact therebetween during rotation of the shaft.

In the preferred arrangement in which the non-rotatable member is mounted for limited movement with respect to the stern tube, the non-rotatable member is conveniently of such shape as to have a sleeve portion adapted to surround the shaft with clearance and to project into the inboard end of the stern tube, the sleeve portion being provided with an annular channel for the reception of a resilient sealing element to provide the required liquid-tight seal between the non-rotatable member and the stern tube. In such an arrangement, the non-rotatable member is preferably prevented from rotating with the shaft by means of studs or carrier pins projecting outwardly from the stern tube or stern tube bushing and passing with sliding clearance through holes in the non-rotatable member, and preferably such studs or carrier pins pass through rubber bushings in the non-rotatable member to provide a resilient support for the non-rotatable member with respect to the stern tube. Springs are provided for urging the non-rotatable member away from the stern tube and towards the rotatable member. These spring conveniently comprise coil springs encircling bolts passing with clearance through the non-rotatable member and being held in position by flanged discs bearing against the non-rotatable member and flanged nuts carried on the screwed portions of the bolts and bearing against the stern tube so that the spring pressure can be readily adjusted: such adjustment can in fact be carried out while the propeller shaft is rotating, a particularly useful feature of the present invention.

As already indicated, the seals of the present invention are intended for use for providing a substantially liquid-tight seal for a ship's propeller shaft at the inboard end of the stern tube in which said shaft is rotatable and according to a further feature of the present invention such a seal comprises a non-rotatable member for the inboard end of the stern tube, a rotatable member for attachment to the shaft for rotation therewith and an intermediate member for interposition between said non-rotatable member and said rotatable member with a sealing element between said intermediate member and said rotatable member so that during rotation of the shaft said non-rotatable member maintains rubbing contact with the adjacent face of said intermediate member, said intermediate member having a bore permitting restricted rocking movement about an axis at right angles to the shaft.

A rotatable seal for a ship's propeller shaft of relatively large diameter (e.g. 20 to 28 inches) will now be described as a preferred embodiment of the present invention with reference to the accompanying drawings in which:

FIG. I is a side elevation of a complete seal in position on a ship's propeller shaft;

FIG. II shows in more detail a sectional elevation of part of the seal shown in FIG. I taken along the line II—II of FIG. I;

FIG. III shows in more detail another sectional elevation of part of the seal as shown in FIG. I taken along the line III—III of FIG. I;

FIG. IV shows in detail a sectional elevation of part of a modified form of the seal shown in FIG. I, the modification making it particularly suitable for use in connection with oil-filled stern tubes; and FIG. V shows diagrammatically in sectional elevation a simple form of seal for use at the stern end of the propeller shaft when an oil-filled stern tube is employed.

Referring to FIGS. I to III of the accompanying drawings, the seal, which provides a liquid-tight joint between the propeller shaft 10 (having as shown a conventional shaft liner 10a) and the inboard end of the stern tube 11 and is suitable for use in place of an existing stuffing box seal, comprises a gland ring 12 forming the non-rotatable member of the seal, the ring 12 having an axial bore 13 providing clearance round the shaft 10. The ring 12 has a sleeve portion 14 which projects into the inboard end of the stern tube 11 and is provided with an annular channel 15 for the reception of a rubber sealing ring 16 which presses against the inner surface of the stern tube to provide a water-tight seal between the sleeve portion 14 of the member 12 and the stern tube bushing 11a of the stern tube 11. As will be understood, the stern tube bushing 11a is fixedly attached to the stern tube; and it may be looked upon as being equivalent to the packing gland of the stuffing box seal which the rotatable seal of the present invention replaces. The member 12 has an annular flange portion 17 having four holes 18 equally spaced around the circumference thereof for the reception respectively of four bolts 19 which bear against the stern tube 11, the size of the holes 18 being such as to permit the bolts 19 to pass through them with ample clearance. Mounted on the bolts 19 are coil springs 20 which are held between flanged discs 21 and flanged nuts 22, the discs being free on the bolts 19 while the nuts 22 are carried on the threaded portions 19a thereof so as to permit adjustment of the spring pressure which urges the non-rotatable member 12 away from the stern tube 11. The member 12 is also provided with an annular face ring 23 which is detachably mounted on the member 12 so as to project away from the member 12 in a direction parallel with the shaft 10. The outer surface 24 of the face ring 23 provides a bearing surface which during rotation of the shaft 10 forms a sealing contact with the surface 25 of a collar 26 forming the intermediate member of the seal, the collar 26 having a slightly convex bore 27 adapted to surround the shaft 10, the profile of the bore 27 being such as to permit the collar 26 to rock to a limited extent on the shaft 10 while at the same time being a sliding fit without sloppiness on the shaft 10. The face ring 23 is conveniently made from leaded bronze and constitutes a renewable facing on the member 12; while the collar 26 is conveniently made from stainless steel. The bore 27 of the collar 26 opens out to form an annular shoulder 28 surrounding the shaft 10 for the reception of a rubber sealing ring 29 arranged to bear against the surface of a collar 30 forming the rotatable member of the seal, the collar 30 being clamped to the shaft 10 for rotation therewith. This collar 30 is provided with two diametrically opposed studs 31 which fit loosely within corresponding drillings 32 in the collar 26 so as to cause rotation of the collar 26 with the collar 30, while at the same time permitting the above-mentioned limited rocking movement of the collar 26. The rotatable seal shown in FIGS. I, II and III therefore comprises essentially a non-rotatable member 12 and a rotatable member 30 having between them an intermediate member 26, the slightly convex bore 27 of which enables the shaft 10 to move slightly with respect to the stern tube 11 without impairing the seal formed by the member 26 bearing against the member 12.

Referring to FIG. III of the drawings, the gland ring 12 is prevented from rotating by two additional studs 33 fixed to the stern tube 11 and projecting through rubber bushings 34 in each of two corresponding holes 35 in the gland ring 12 so as to provide a resilient mounting for the gland ring 12 with respect to the stern tube 11. FIG. III also shows the provision of lubricating channels 36 in the gland ring 12 to enable the rubbing face 24 of the face ring 23 to be lubricated during operation of the seal. Cooling of the rubbing parts 24 and 26 of the seal during operation thereof is achieved by water circulation, the water entering and leaving the annular space 13 round the shaft 10 via two channels of which one is shown at 37 in FIG. II.

During operation of the seal shown in FIGS. I to III, the rubbing face 24 of the face ring 23 fixed to the non-rotatable member 12 is urged against the intermediate member 26 by means of the pressure exerted by the springs 20, and also by the hydraulic pressure due to water within the annular space 38 between the shaft 10 and the stern tube 11. Although it is common practice to line this annular space with lignum vitae wood it will be appreciated that when a large sea-going vessel is loaded and low in the water there is appreciable hydraulic pressure available in the stern tube for maintaining rubbing contact, though some adjustment of the spring pressure is usually necessary when the ship is in ballast and therefore appreciably higher in the water, such adjustment being readily effected during operation of the seal. This ease of adjustment is an important advantage of the present invention. Also since the rubber sealing ring 16 is subject to virtually no wear during operation of the seal, a simple rubber O ring provides an adequate seal between the member 12 and the stern tube 11. In fact, there is normally such little movement of the ring 16 axially of the shaft 10 that a sleeve of thin terylene cloth 16a is preferably provided to prevent any tendency for the rubber ring 16 to adhere to the stern tube 11. Likewise the rubber ring 29 which, although free (in the sense of not being attached to the members 26 and 30 on the shaft 10), is compressed between the intermediate member 26 and the rotatable member 30 and rotates therewith provides an adequate water-tight seal between these members 26, 30 since both members rotate together so that there is no relative movement of the rubber ring 29 with respect to these members or to the shaft 10.

In the further modification shown in FIG. IV of the drawings the collar 26 constituting the intermediate member is provided on its rubbing face with a resilient insert comprising a ring of synthetic rubber 39 having a grooved outer surface 40 adapted to bear against the rubbing surface 24 of the face ring 23. Such a modified seal is intended for use in conjunction with an oil-filled stern tube, the rubber ring 39 being for the purpose of preventing oil leakage through the seal. As will be appreciated, it is possible to tolerate a very small water leakage which might tend to occur occasionally with the seal of FIGS. I to III, but in the case of an oil-filled stern tube it is highly desirable to prevent even an occasional slight oil seepage and it has been found that this can be adequately achieved, while at the same time having a fully adequate rubbing surface from the wear point of view, by providing a rubber insert of the kind shown at 39 in FIG. IV. When using an oil-filled stern tube, the outboard end of the stern is provided with a simple gland, for example, of the kind shown in FIG. V of the drawings, for the purpose of containing the oil in the stern tube and preventing the ingress of sea water.

Referring to FIG. V, the outboard end gland conveniently comprises a retaining ring 41 surrounding the shaft 10 with a conventional sealing ring 42 between the retaining ring 41 and the propeller 43, and a bearing retaining ring 44 screwed into the outboard end of the stern tube 11 with a sealing ring 45 to prevent oil leakage round the ring 44; the ring 44 forming a retainer for the conventional lignum vitae wood lining 46 (or any other shaft bearing material) and at the same time providing a housing for a rubbing ring 47 of hard rubber or plastic material against which a spring-loaded gland ring 48 is adapted to bear to form a rubbing seal, the gland ring 48 being housed within a sleeved portion 41a of the retaining ring 41 from which it is sealed by a simple O ring seal 49.

Particular advantages of the rotatable seals of the present invention include the ability to enable adjustment of the sealing pressure to be readily effected as and when required without having to dismantle any of the parts and, in the case of those seals in which the non-rotatable member, the intermediate member and the rotatable member each comprise two parts which are simply bolted together in situ (as in the case of the seals shown in FIGS. I to IV of the drawings by bolts 50, 51 and 52), the ability to be used as replacements for conventional stuffing box seals without having to resort to dismantling of the shaft from the stern tube. As far as seal adjustment is concerned, this can readily be effected while the seal is in use, i.e. without having to stop the propeller shaft which is a particularly valuable advantage for marine use.

I claim as my invention:

1. A seal comprising a non-rotatable member for the inboard end of a stern tube, a rotatable member of attachment to a shaft for rotation therewith and an intermediate member for interposition between said non-rotatable member and said rotatable member, a sealing element between said intermediate member and said rotatable member so that during rotation of the shaft said non-rotatable member maintains rubbing contact with the adjacent face of said intermediate member, said inermediate member having a convex bore permitting restricted rocking movement about an axis at right angles to the shaft.

2. A seal as claimed in claim 1, wherein the non-rotatable member is adapted for mounting on the stern tube so as to be capable of limited relative movement with respect to the stern tube in a direction axially of the shaft, a sealing element being provided between said non-rotatable member and the stern tube.

3. A seal as claimed in claim 2, wherein the non-rotatable member is adapted for mounting on the stern tube with a plurality of springs between the stern tube and the non-rotatable member for urging said non-rotatable member towards the intermediate member, said springs being mounted on nut and bolt assemblies carried by the non-rotatable member.

4. A seal as claimed in claim 1, wherein the nonrotatable member comprises a ring having a sleeved portion for insertion within the inboard end of the stern tube, said sleeved portion having an annular channel housing a resilient sealing element to provide a seal between the non-rotatable member and the stern tube.

5. A seal as claimed in claim 1, wherein the non-rotatable member is provided with a detachable face ring adapted to provide a rubbing surface for sealing contact with a surface of the intermediate member.

6. A seal as claimed in claim 1, wherein means are provided for coupling said intermediate member and said rotatable member in such a manner that said members rotate together while permitting the required relative movement of said shaft with respect to the stern tube.

7. A seal as claimed in claim 1, wherein the bore of the intermediate member is shouldered to form a housing for the resilient seal in the form of a rubber ring between said intermediate member and said rotatable member.

8. A seal as claimed in claim 1, wherein said intermediate member is provided with an inset element of synthetic rubber adapted to bear against the rubbing surface of the non-rotatable member, said inset element having a grooved surface for contacting said non-rotatable member.

9. A sealing device for use in combination with a ship's propeller shaft and stern tube comprising a first ring mounted on the propeller shaft at the inboard end thereof, a second ring adjacent to said first ring and having an outwardly positioned vertical face, said second ring having a bore of convex form, an annular sealing element between the propeller shaft, said first ring and said second ring, a non-rotatable member on the inboard end of the stern tube having a vertical face, and biasing means keeping the vertical face on said second ring in contact with the vertical face of said non-rotatable member during rotation of the propeller shaft.

References Cited in the file of this patent
UNITED STATES PATENTS 2,567,809    Greiner _____ Sept. 11, 1951
2,814,511    Truax _____ Nov. 26, 1957